United States Patent
Jablonowski

[11] 3,710,075
[45] Jan. 9, 1973

[54] THERAPEUTIC LEGGING
[76] Inventor: Virginia M. Jablonowski, 260 Rowe Road, Milford, Mich. 48042
[22] Filed: Nov. 18, 1971
[21] Appl. No.: 199,876

Related U.S. Application Data
[63] Continuation-in-part of Ser. No. 53,208, July 8, 1970.

[52] U.S. Cl. ................... 219/211, 219/527, 219/549
[51] Int. Cl. ............................................. H05b 1/00
[58] Field of Search...... 219/211, 212, 527, 529, 549; 128/379, 384, 402, 82, 82.1; 126/204

[56] References Cited

UNITED STATES PATENTS

| | | | |
|---|---|---|---|
| 2,617,916 | 11/1952 | Neidnig | 219/527 |
| 3,437,792 | 4/1969 | Lauck | 219/212 X |
| 3,543,005 | 11/1970 | Keleman | 219/212 X |
| 2,842,655 | 7/1958 | Schwebel | 219/528 X |
| 3,108,175 | 10/1963 | Zartman et al. | 219/212 X |

Primary Examiner—C. L. Albritton
Attorney—William H. Griffith

[57] ABSTRACT

A therapeutic legging for bovine, equine or like animals, comprising an electrically heated sleevelike covering contoured to fit the leg of an animal. The sleevelike covering may be battery operated or it may be plugged into a standard alternating current outlet. An adjustable control regulates the amount of electrical energy delivered to the heating element for the covering, and means are provided for preventing excessive heating to protect the animal and also the materials of the covering.

1 Claim, 4 Drawing Figures

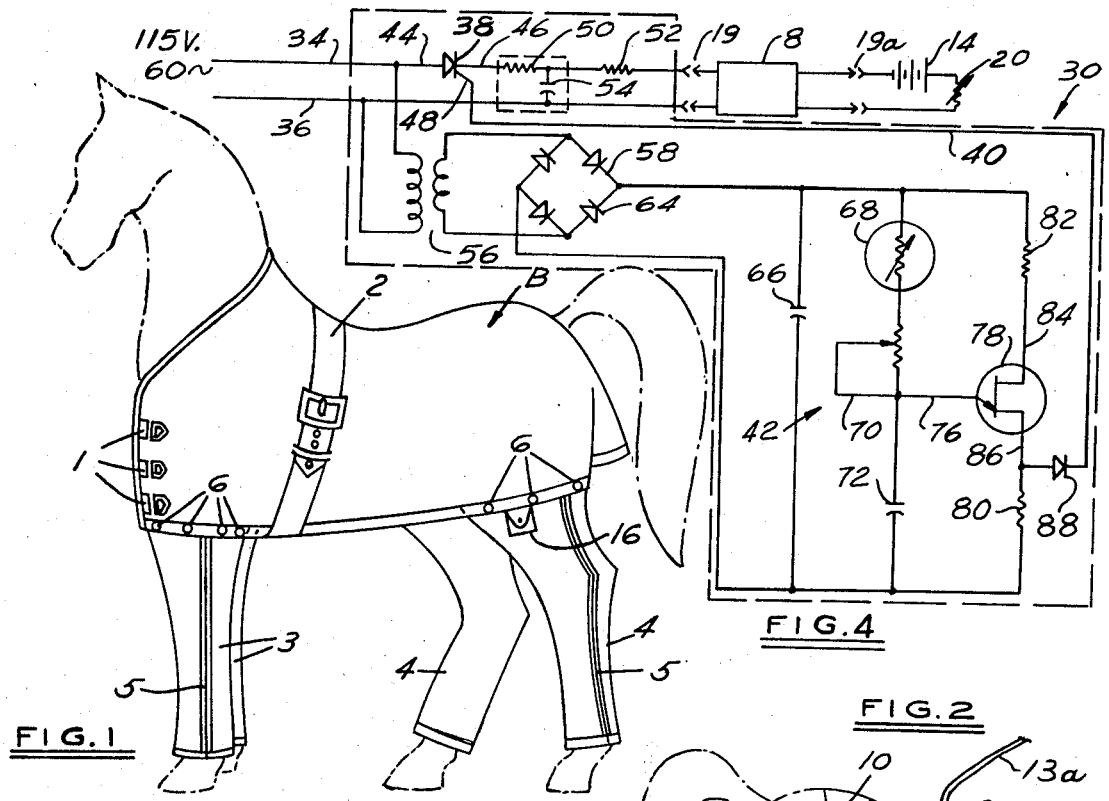

THERAPEUTIC LEGGING

PRIORITY

This application is a continuation-in-part of my copending application Ser. No. 53,208, filed July 8, 1970.

SUMMARY OF THE INVENTION

This invention is designed particularly to provide electrical therapeutic heat for the treatment of the legs of bovine, equine and like animals and also may sever to protect the legs of the animals in severe cold weather. The legging may be used to treat the legs of race horses during the winter racing season and keep them warm. It is also extremely useful for brood mares, ailing animals and animals with sore legs.

An important object of this invention is to apply heat to treat the legs of animals for every possible lameness with or without the assistance of liniments, salves and medicines.

Another object is to provide a legging in the form of a sleeve contoured to fit snugly around the leg of an animal and provided with an electric heating element.

Another object is to provide a legging which may be either battery operated or operated from a standard outlet for alternating electric current.

Another object is to provide adjustable means for controlling the amount of electrical energy supplied to the heating element to regulate its temperature.

Another object is to provide means for preventinG overheating of the sleeve and possible injury to the animal.

Other objects and features of the invention will become apparent as the description proceeds, especially when taken in conjunction with the accompanying drawing, wherein:

FIG. 1 is a perspective view of a horse having the legs covered with the therapeutic leggings of my invention.

FIG. 2 is a fragmentary view showing a slightly modified legging held up by a strap rather than by being secured to a blanket as in FIG. 1.

FIG. 3 is an inside view of the legging shown in FIG. 2, opened out and laid flat.

FIG. 4 is a wiring diagram showing the control circuit for the heating element of the legging.

Referring now more particularly to the drawing and especially to FIG. 1 thereof, a blanket B is shown applied over the body of a horse, secured in front by the releasable fastening means here shown as being in the form of belts and buckles 1. A belt 2 encircles the body of the horse over the blanket with the ends of the belt 2 suitably secured together as by the buckle shown.

The legs of the horse are encased in sleevelike coverinGs or leggings 3 and 4. These leggings are substantially the same although the rear leggings 4 are contoured differently than the front leggings 3 as will be apparent in the drawing.

Each legging is in the form of an elongated open-ended tube or sleeve. It is formed of any suitable flexible and preferably heat-insulating material such as nylon, kapok, canvas, wool or cotton. The length of the legging will depend upon the height of the horse and as shown covers substantially the full length of the leg.

Each legging is longitudinally split so that it can be readily put on and taken off. Any suitable fastening means may be provided along the longitudinal edges of the leggings to secure them together along the split. In the specific embodiment shown in FIG. 1, each legging has a zipper 5 for the full length thereof to releasably hold the longitudinal edges of the legging together and close the legging closely about the leg of the animal.

Any suitable means may be provided for securing the leggings to the animal. In FIG. 1, the tops of the leggings are secured to the lower edge of the blanket by snaps. Accordingly, complementary snap elements are provided along the top edges of the leggings and along the lower edge of the blanket. These snaps are designated 6.

FIG. 2 shows a slightly modified legging 7 which is the same as leggings 3 and 4 except that it is buckled around the leg of the animal instead of zippered. The legging 7 has snaps 9 along its upper edge which are snapped to the belt 10 which is applied around the body of the animal. This belt has its ends releasably buckled together and may be used to support the legging when the horse is not covered with the blanket.

FIG. 3 shows the legging of FIG. 2 from the inside when it is laid out flat. Legging 7 has the belts and buckles 11 and 12 along its longitudinal edges for releasably securing the legging around the leg of the animal. The heating means for the legging 7 comprises an elongated insulated heating wire or ribbon 8 which extends sinuously over substantially the entire surface area of the legging. Thus as seen in FIG. 3, the heating wire 8 extends from the top to the bottom and back and forth throughout substantially the full length and width of the legging.

It will be understood that the heating element for the leggings 3 and 4 may be exactly the same as the heating element for the legging 7 shown in FIG. 3.

An electrical control unit 15 can be held in a pocket 16 on the outer surface of the legging, the pocket being closed by a flap 17 which is held closed by a snap fastener 18 or the like. The control unit 15 may also if desired be located at some other place remote frOm the legging. A water resistant electric cord 13 shown in FIG. 3 is the connection 19 (see FIG. 4) which either plugs into an extension cord 13a leading to the control unit 15 when the control unit is remote from the legging, or plugs into the control unit itself when the control unit is carried in the pocket 16 on the as shown in the drawing. Wiring is then taken from the other end of the control unit 15 to a standard A.C. receptacle to energize the heating wire 8 of any one of the leggings 3, 4 or 7. The operation of the electrical control unit 15 for regulating the temperature of the heating wire 8 and for preventing overheating is described more fully hereinafter. Everything within the broken lines in FIG. 4 is in the control unit 15, except the automatic temperature control resistor 68 which is in the therapeutic device.

Alternatively, a remote battery 14 may be used for the purpose of supplying the necessary energy to heat the heating wire 8 of any one of the leggings. The battery 14 would be plugged into the heating wire at 19a instead of into the electrical control unit 15. It will be seen in FIG. 4 that a variable resistance of rheostat 20 may be provided in the circuit of the battery 14 to control the temperature to which the heating element is heated.

It should be understood that the blanket B might be heated by a heating wire 8 either from the battery 14 or from an A.C. receptacle through a control unit 15 either carried by the blanket B or disposed in a remote position, in the same manner as the leggings 3, 4 or 7 are heated as specifically described herein. In other words, the therapeutic device for treating an animal may, for example, be in the form of a legging or a blanket.

The leggings are readily applied to and removed from the legs of the animal. They may first be fitted around the legs and then zippered up by the zipper 5 shown in FIG. 1 or buckled by the buckles in FIG. 3. Obviously any suitable type of releasable securing means may be provided.

The tops of the leggings are then snapped or otherwise releasably secured to the blanket or to a body belt on the animal to hold the leggings in place. Then, when operated, power (A.C. with control unit; D.C. with rheostat) is turned on to energize the heating wire 8 and keep the leg of the animal therapeutically treated. The use of a battery-operated heating element makes it possible to use the heated leggings of my invention even when the animal is in transit by any vehicle with a 12-volt battery source or in the event of A.C. power failure. The heat generated by the heating element will be substantially retained within the legging by reason of its heat insulating character. Of course instead of using a battery, the heating element may be plugged into a standard wall socket by use of an extension cord which is first connected to the control unit.

It will be apparent from the foregoing that the legs of an ailing horse or of a racing horse may be more effectively treated.

The electrical control unit 15 includes the control circuit 30. In the circuit 30 the heating wire of the legging is heated in accordance with the average energy passed through the conductors 34 and 36. This average energy is a selected portion of the positive swing of an alternating current signal. The selection of the portion of the alternating current signal is accomplished by varying the time at which a trigger signal is applied to the silicon controlled rectifier 38 over the conductor 40 form the trigger circuit 42. Thus, the trigger signal over the conductor 40 may occur any time during the positive half cycle of the alternating input signal. To vary the time when the silicon controlled rectifier 38 will permit current to pass through the heating wire of the legging, control 70 is varied.

The energy passed through the legging may be considered as the average of the area under the positive half of the alternating electrical input signal between the time at which the trigger pulse is applied to the silicon controlled rectifier 38 over the line 40 and the time that the input signal goes negative, at which time the silicon controlled rectifier 38 will again be cut off.

The silicon controlled rectifier 38 has two electrodes 44 and 46 through which current will pass only in one direction; that is, the positive cycles only of the alternating current input signal will pass through the silicon controlled rectifier 38, and then only after there is a trigger pulse on the control electrode 48 of the silicon controlled rectifier 38.

The filter circuit including the resistor 50 and the capacitor 54 is a normal resistance capacitance filter circuit which will provide a relatively smooth average direct current potential through the legging on receipt of the positive pulses passing through the silicon controlled rectifier 38. The resistance 52 is to limit the actual current passing through the legging to a value at which the physical components of the circuit can easily withstand.

The trigger circuit 42 includes a step down alternating current transformer 56 for receiving an alternating signal from the conductors 34 and 36, and a full wave bridge rectifier 58 for inverting the negative half cycles of the alternating current signal. The components 64 are diodes connected in the usual manner for a diode full wave rectifier. Capacitor 66 is a normal filter capacitor for filtering the full wave signal from the rectifier to provide a substantially constant direct current voltage level across the voltage divider consisting of the automatic temperature control resistor 68, the manually adjustable temperature adjust potentiometer 70 and the capacitor 72.

The automatic temperature control resistor 68 and temperature adjust potentiometer 70 provide resistance which in combination with the capacitor 72 provide an RC time constant through which the capacitor 72 is charged by the direct current voltage level toward a value on the control electrode 76 which will fire the unijunction transistor switch 78. The capacitor 72 is then discharged through the unijunction transistor 78, the voltage dropping resistor 82 and the load resistor 80.

The temperature adjust potentiometer 70 is adjustable manually to vary the electrical energy to the legging, and hence regulate its temperature. The automatic temperature resistor 68 is in the legging and senses its actual temperature. It is provided to keep the temperature of the legging substantially constant despite changes in ambient temperature. It will also prevent overheating and injury to the animal or to the material of the legging in the event of an excessive current demand due to a demand heating element in the legging, or inadvertent failure of another nature.

After the capacitor 72 has discharged to a predetermined voltage level, the unijunction transistor 78 will turn off due to the low voltage on the control electrode 76 thereof and the capacitor will again be recharged through the automatic temperature control resistor 68 and temperature adjust potentiometer 70. The charging and discharging of the capacitor 72 and therefore the turning on and off of the unijunction electronic switch 78 will thus be repeated indefinitely and at a precise time, depending on the setting of the resistance value of the temperature adjust potentiometer 70 combined with the resistance of the automatic temperature resistor 68 which varies concurrently with the temperature of the legging.

The automatic temperature control resistor 68 may be one of a number of types of resistances and/or semiconductor devices, the resistance of which varies with temperature, such for example as a thermistor. This device is sensitive to ambient temperatures; that is, the resistance changes with the ambient temperature. The resistance goes up as the temperature goes up, since it is desirable to fire the silicon controlled rectifier 38 at a later time in the positive half cycle of the input alternating current if the ambient temperature were higher.

The initial setting of the desired firing point of the silicon controlled rectifier would be with the potentiometer 70 within a small range of resistance values. The automatic temperature control could vary the resistance in the RC member including the resistor 68, potentiometer 70 and capacitor 72 to maintain the selected temperature setting, even though changes in ambient conditions occurred.

The unijunction transistor 78 is a well known switch and has the two primary electrodes 84 and 86 between which current will be passed when the voltage on the control electrode 76 is at a predetermined exact potential. The load for the trigger circuit is taken out through the resistance 80, through the blocking diode 88, which isolates the trigger circuit 44 from spurious signals which might find their way down through the conductor 40. The resistor 82 drops the voltage from the full wave bridge rectifier 78 to a desired operating voltage for the particular electronic switch 78 chosen.

Thus, in overall operation, with the conductors 34 and 36 plugged into a 115-volt alternating current 60-cycle source of electrical energy, the alternating current signal is passed to the silicon controlled rectifier 38 which will not let the alternating current signal pass until a trigger signal is received at the control electrode 48. To obtain a proper trigger signal at the control electrode 48, the temperature adjust potentiometer 70 is manually set for the temperature at which it is desired to maintain the legging. During the positive half cycle of the alternating electrical signal the capacitor 72 will charge through the automatic temperature control resistor 68 and the temperature adjust potentiometer 70 to the point where the voltage on the control electrode 76 of the unijunction transistor 78 is such that the unijunction transistor 78 will conduct through the voltage dropping resistor 82 and the load resistor 80.

Conduction of the unijunction transistor 78 will develop a trigger signal through the blocking diode 88 to the control electrode 48 of the silicon controlled rectifier 38. Thus, the silicon controlled rectifier 38 will be turned on from receipt of the trigger signal on the electrode 48 until the input alternating current signal in the same cycle goes negative, at which time the silicon controlled rectifier 38 will be turned off. A pulse of energy is thus passed through the filter resistor 50 across the filter capacitor 54, and through the current limiting resistor 52 and through the heating wire of the legging.

At the same time that the trigger signal is developed across resistor 80 on unijunction transistor 78, the capacitor 72 will be discharged through the unijunction transistor 78 to the point where the unijunction transistor 78 will be turned off again. When the unijunction transistor 78 turns off, the capacitor 72 will again start to charge through the automatic temperature control resistor 68 and the temperature adjust potentiometer 70, and after a time determined by the value of the resistances determined in the automatic temperature control resistor 68 and the temperature adjust potentiometer 70 will again be charged to the point where the voltage on the control electrode 76 will turn the unijunction transistor 78 on and provide another signal to the silicon controlled rectifier 38. With the proper choosing of the circuit components, the turning on of the unijunction transistor 78 can be made to occur at exactly the same point in the positive half cycle of the input signal for each cycle of the input signal, and that point can be adjusted by varying the adjust potentiometer 70 whereby the signal to the legging is a pulse of electrical energy for each half cycle of the input signal, the magnitude of which is determined by the point in the positive half cycle of the input signal at which the trigger signal is developed.

It will be understood that the legging may be heated either by the battery 14 or by the standard AC current through control unit 15 and circuit 30.

What I claim as my invention is:

1. A therapeutic legging for treating a leg of a bovine, equine or like animal, comprising a covering in the form of a contoured sleeve adapted to fit around the leg of the animal, said sleeve being formed of a flexible, heat insulating material which is longitudinally split so as to be readily applied to and removed from the leg of the animal, releasable fastening means for securing the longitudinal edges of said sleeve together along said split, releasable fastening means at one end of said sleeve for retaining said sleeve on the leg of the animal, heating means comprising an elongated electric heating element secured to said sleeve and extending throughout a major portion of the length and width thereof, an electric control unit for said heating element, a pocket on said sleeve for removably receiving said control unit, said control unit including an electric control circuit adapted to be connected to said heating element, said electric circuit including a silicon controlled rectifier adapted to pass current upon being triggered, said electric control circuit also having a trigger circuit for periodically triggering said rectifier, said trigger circuit including a capacitor, an electronic switch for discharging said capacitor to transmit a triggering signal to said rectifier, a potentiometer for controlling said electronic switch, an automatic temperature sensitive resistor for preventing overheating of said sleeve, a battery unit including a battery and a variable resistance control therefor, said heating element having means for selectively plugging into said electric control unit or said battery unit, said sleeve having an inner layer of non-absorbing material such that liniments used to treat the leg of the animal will not penetrate said sleeve.

* * * * *